United States Patent
Meyerzon et al.

(10) Patent No.: US 11,709,878 B2
(45) Date of Patent: Jul. 25, 2023

(54) ENTERPRISE KNOWLEDGE GRAPH

(71) Applicant: Microsoft Technology Licensing, LLC, Redmond, WA (US)

(72) Inventors: Dmitriy Meyerzon, Bellevue, WA (US); Jeffrey Wight, Kirkland, WA (US); Andrei Razvan Popov, Woodinville, WA (US); Andrei-Alin Corodescu, Oslo (NO); Omar Faruk, Oslo (NO); Jan-Ove Karlberg, Troms (NO); Åge Andre Kvalnes, Fetsund (NO); Helge Grenager Solheim, Oslo (NO); Thuy Duong, Seattle, WA (US); Simon Thoresen Hult, Oslo (NO); Ivan Korostelev, London (GB); Matteo Venanzi, London (GB); John Guiver, Saffron Walden (GB); John Michael Winn, Cambridge (GB); Vladimir V. Gvozdev, Sammamish, WA (US); Nikita Voronkov, Bothell, WA (US); Chia-Jiun Tan, Bellevue, WA (US); Alexander Armin Spengler, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 566 days.

(21) Appl. No.: 16/601,050

(22) Filed: Oct. 14, 2019

(65) Prior Publication Data
US 2021/0110278 A1    Apr. 15, 2021

(51) Int. Cl.
*G06F 16/00* (2019.01)
*G06F 16/35* (2019.01)
(Continued)

(52) U.S. Cl.
CPC .......... *G06F 16/355* (2019.01); *G06F 16/288* (2019.01); *G06F 16/9024* (2019.01);
(Continued)

(58) Field of Classification Search
CPC .. G06F 16/9024; G06F 40/295; G06F 16/334; G06F 16/338; G06F 16/355;
(Continued)

(56) References Cited

U.S. PATENT DOCUMENTS 8,594,996 B2   11/2013  Liang
9,589,069 B2    3/2017  Yang et al.
(Continued)

OTHER PUBLICATIONS

"Amazon Neptune", Retrieved from: https://web.archive.org/web/20190819015741/https:/aws.amazon.com/neptune/, Aug. 19, 2019, 14 Pages.
(Continued)

*Primary Examiner* — Shyue Jiunn Hwa
(74) *Attorney, Agent, or Firm* — Arentfox Schiff LLP

(57) ABSTRACT

Examples described herein generally relate to a computer system for generating a knowledge graph storing a plurality of entities and to displaying a topic page for an entity in the knowledge graph. The computer system performs a mining of source documents within an enterprise intranet to determine a plurality of entity names. The computer system generates an entity record within the knowledge graph for a mined entity name based on an entity schema and the source documents. The entity record includes attributes aggregated from the source documents. The computer system receives a curation action on the entity record from a first user. The computer system updates the entity record based on the curation action. The computer system displays an entity
(Continued)

page including at least a portion of the attributes to a second user based on permissions of the second user to view the source documents.

17 Claims, 9 Drawing Sheets

(51) Int. Cl.
*G06N 5/02* (2023.01)
*G06F 16/93* (2019.01)
*G06F 16/901* (2019.01)
*G06F 16/28* (2019.01)
*G06F 18/23* (2023.01)

(52) U.S. Cl.
CPC .............. *G06F 16/93* (2019.01); *G06F 18/23* (2023.01); *G06N 5/02* (2013.01)

(58) Field of Classification Search
CPC .... G06F 16/367; G06F 16/951; G06F 16/211; G06F 16/24578; G06F 16/2465; G06F 16/26; G06F 16/313; G06F 16/35; G06F 16/36; G06F 16/9535; G06F 40/279; G06F 16/285; G06F 16/288; G06F 16/353; G06F 16/906; G06F 16/93; G06F 17/21; G06F 17/278; G06F 17/2785; G06F 17/30598; G06F 17/30604; G06F 17/30707; G06F 17/30958; G06F 40/10; G06F 40/169; G06F 40/205; G06F 40/247; G06F 40/268; G06F 40/284; G06F 40/30; G06F 16/248; G06F 40/186; G06F 40/40; G06F 16/9536; G06F 16/90335; G06F 3/0484; G06F 3/04817; G06F 3/0482; G06F 40/106; G06F 16/144; G06F 16/2393; G06F 16/24564; G06F 16/258; G06F 16/90341; G06F 16/9038; G06F 3/0488; G06F 16/00; G06F 16/22; G06F 16/23; G06F 16/2358; G06F 16/2379; G06F 16/243; G06F 16/245; G06F 16/24552; G06F 16/2471; G06F 16/256; G06F 16/289; G06F 16/322; G06F 16/3331; G06F 16/3344; G06F 16/90324; G06F 18/2155; G06F 21/604; G06F 21/6218; G06F 2216/03; G06F 3/04883; G06F 3/04847; G06N 5/02; G06N 5/022; G06N 20/00; G06N 7/005; G06N 5/00; G06N 5/025; G06N 20/10; G06N 5/003; G06N 3/0454; G06N 3/08; G06N 99/005; G06K 9/6259; G06K 9/6218; G06V 10/82; G06V 30/418

See application file for complete search history.

(56) References Cited

U.S. PATENT DOCUMENTS

| | | | |
|---|---|---|---|
| 9,798,829 B1* | 10/2017 | Baisley | G06F 16/9024 |
| 10,078,651 B2 | 9/2018 | Kelly et al. | |
| 10,108,700 B2 | 10/2018 | Gupta et al. | |
| 10,140,384 B2 | 11/2018 | Sathish et al. | |
| 10,810,193 B1 | 10/2020 | Subramanya et al. | |
| 2006/0020595 A1 | 1/2006 | Norton et al. | |
| 2007/0112714 A1 | 5/2007 | Fairweather | |
| 2010/0042623 A1 | 2/2010 | Feng et al. | |
| 2012/0246175 A1 | 9/2012 | Duan et al. | |
| 2014/0156567 A1* | 6/2014 | Scholtes | G06N 5/02 706/12 |
| 2014/0282219 A1 | 9/2014 | Haddock | |
| 2014/0324805 A1 | 10/2014 | Agarwal et al. | |
| 2015/0095303 A1 | 4/2015 | Wu et al. | |
| 2015/0317376 A1 | 11/2015 | Bauer et al. | |
| 2017/0364808 A1 | 12/2017 | Fothergill et al. | |
| 2018/0082183 A1 | 3/2018 | Hertz et al. | |
| 2018/0165352 A1 | 6/2018 | Huang et al. | |
| 2018/0232204 A1 | 8/2018 | Ghatage et al. | |
| 2018/0232443 A1 | 8/2018 | Delgo et al. | |
| 2019/0005395 A1 | 1/2019 | Dutkowski | |
| 2019/0197442 A1* | 6/2019 | Lu | G06Q 20/4016 |
| 2019/0266336 A1 | 8/2019 | Scheideler et al. | |
| 2020/0394539 A1 | 12/2020 | Sethre et al. | |
| 2021/0109952 A1 | 4/2021 | Meyerzon et al. | |
| 2021/0133216 A1 | 5/2021 | Meyerzon et al. | |
| 2022/0019579 A1 | 1/2022 | Meyerzon et al. | |

OTHER PUBLICATIONS

"Mining Dynamic Knowledge Graphs", Retrieved from: https://www-druid.irisa.fr/mining-dynamic-knowledge-graphs/, Retrieved Date: Aug. 21, 2019, 3 Pages.

Fernandez, et al., "Aurum: A Data Discovery System", In Proceedings of IEEE 34th International Conference on Data Engineering, Apr. 16, 2008, 12 Pages.

Graham, et al., "Overview of Microsoft Graph", Retrieved from: https://web.archive.org/web/20190904180353/https://docs.microsoft.com/en-us/graph/overview, Jul. 31, 2019, 7 Pages.

He, et al., "Building the LinkedIn Knowledge Graph", Retrieved from: https://engineering.linkedin.com/blog/2016/10/building-the-linkedin-knowledge-graph, Oct. 6, 2016, 7 Pages.

Ivanov, Yanko, "What is an Enterprise Knowledge Graph and Why Do I Want One?", Retrieved from: https://enterprise-knowledge.com/what-is-an-enterprise-knowledge-graph-and-why-do-i-want-one/, Nov. 1, 2018, 4 Pages.

Kotov, Alexander, "Knowledge Graph Entity Representation and Retrieval", In 10th Russian Summer School in Information Retrieval, Aug. 22, 2016, 25 Pages.

Marino, Chris, "A Knowledge Graph Feast", Retrieved from: https://enterprise-knowledge.com/a-knowledge-graph-feast/, Nov. 20, 2018, 4 Pages.

Masuch, Lukas, "Enterprise Knowledge Graph—One Graph to Connect Them All", Retrieved from: https://www.managementexchange.com/hack/enterprise-knowledge-graph-one-graph-connect-them-all, Mar. 28, 2014, 8 Pages.

Moore, et al., "Knowledge Graphs: The Path to Enterprise AI", Retrieved from: https://neo4j.com/blog/knowledge-graphs-path-to-enterprise-ai/, Jul. 11, 2018, 25 Pages.

Song, et al., "Building and Querying an Enterprise Knowledge Graph", In Journal of IEEE Transactions on Services Computing, vol. 12, Issue 3, May 2019, pp. 356-369.

"Non Final Office Action Issued In U.S. Appl. No. 16/601,082", dated Mar. 29, 2021, 17 Pages.

"International Search Report and Written Opinion issued in PCT Application No. PCT/US20/056953", dated Feb. 19, 2021, 10 Pages.

"Non Final Office Action Issued in U.S. Appl. No. 16/735,262", dated May 6, 2021, 18 Pages.

"Named Entity Recognition & Bayesian Inference for Target Audience Projection", Retrieved From: https://medium.com/@datasciencemilan/named-entity-recognition-bayesian-inference-for-target-audience-projection-cfa77f46eae0, Oct. 20, 2019, 7 Pages.

"Notice of Allowance Issued in U.S. Appl. No. 16/933,888", dated Oct. 24, 2022, 15 Pages.

"Non Final Office Action Issued in U.S. Appl. No. 16/933,888", dated Mar. 3, 2022, 28 Pages.

Al-Moslmi, "Named Entity Extraction for Knowledge Graphs: A Literature Overview", In Journal of IEEE Access, vol. 8, Feb. 14, 2020, pp. 32862-32881.

David, Robert, "Knowledge Graphs as a Service", Retrieved From: https://2019.semantics.cc/knowledge-graphs-service, Jul. 26, 2019, 4 Pages.

Duc, et al., "Extended Named Entity Recognition API and Its Applications in Language Education", In Proceedings of the 55th

(56) References Cited

OTHER PUBLICATIONS

Annual Meeting of the Association for Computational Linguistics-System Demonstrations, Jul. 30, 2017, pp. 37-42.

Florez, et al., "Named Entity Recognition using Neural Networks for Clinical Notes", In Proceedings of Machine Learning Research, May 16, 2018, pp. 7-15.

Gianmario, et al., "Named Entity Recognition + Bayesian Inference for Target Audience Projection", Retrieved From: https://www.meetup.com/Data-Science-Milan/events/264951303/, Oct. 9, 2019, 6 Pages.

Gui, et al., "Leveraging Document-Level Label Consistency for Named Entity Recognition", In Proceedings of the 29th International Joint Conference on Artificial Intelligence, Jul. 8, 2020, pp. 3976-3982.

Liu, et al., "Hamner: Headword Amplified Multi-span Distantly Supervised Method for Domain Specific Named Entity Recognition", In Proceedings of The Thirty-Fourth AAAI Conference on Artificial Intelligence, Feb. 7, 2020, 8 Pages.

"International Search Report and Written Opinion Issued in PCT Application No. PCT/US21/030806", dated Aug. 11, 2021, 13 Pages.

Peng, Cheng, "A Bert Based Relation Classfication Network for Inter-Personal Relationship Extraction", In Proceedings of China Conference on Knowledge Graph and Semantic Computing, Aug. 24, 2019, 7 Pages.

Schwabe, et al., "Trust and Privacy in Knowledge Graphs", In Companion Proceedings of the World Wide Web Conference, May 13, 2019, pp. 722-728.

Taher, et al., "Beheshti-NER: Persian Named Entity Recognition Using BERT", In Repository of arXiv:2003.08875v1, Mar. 19, 2020, 6 Pages.

Winn, et al., "Alexandria: Unsupervised High-Precision Knowledge Base Construction using a Probabilistic Program", In Proceedings of 1st Conference on Automated Knowledge Base Construction, May 20, 2019, 20 Pages.

\* cited by examiner

ENTERPRISE KNOWLEDGE GRAPH

BACKGROUND

The present disclosure relates to knowledge graphs, and more particularly to proprietary knowledge graphs for an enterprise.

Search engines and conversational assistants require huge stores of knowledge in order to answer questions and understand basic facts about the world. Such a store of knowledge is referred to as a knowledge graph or knowledge base and comprises facts about entities and relations between the entities. Forming knowledge graphs which are accurate, up-to-date, and complete remains a significant challenge.

A proprietary knowledge graph for an enterprise faces particular challenges in that the information to be stored in the knowledge graph may be confidential to the enterprise. The enterprise may lack the ability to design a knowledge graph, but may also be unwilling to share the underlying information with a third party.

The embodiments described below are not limited to implementations which solve any or all of the disadvantages of known knowledge graph construction systems.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an example, the disclosure provides a computer system for generating an enterprise knowledge graph. The computer system may include a memory storing computer-executable instructions. The computer system may include a processor configured to execute the instructions. The processor may be configured to perform a mining of a set of enterprise source documents within an enterprise intranet to determine a plurality of entity names. The processor may be configured to generate an entity record within a knowledge graph for a mined entity name from the plurality of entity names based on an entity schema and ones of the set of enterprise source documents associated with the mined entity name, the entity record including attributes aggregated from the ones of the set of enterprise source documents associated with the mined entity name. The processor may be configured to receive a curation action on the entity record from a first user associated with the entity record via the mining. The processor may be configured to update the entity record based on the curation action. The processor may be configured to display an entity page including at least a portion of the attributes of the entity record to a second user based on permissions of the second user to view the ones of the set of enterprise source documents associated with the mined entity name.

The disclosure also provides a method of managing an entity record within a knowledge graph. The method may include performing a mining of a set of enterprise source documents within an enterprise intranet to determine a plurality of entity names. The method may include generating an entity record within a knowledge graph for a mined entity name from the plurality of entity names based on an entity schema and ones of the set of enterprise source documents associated with the mined entity name, the entity record including attributes aggregated from the ones of the set of enterprise source documents associated with the mined entity name. The method may include receiving a curation action on the entity record from a first user associated with the entity record via the mining. The method may include updating the entity record based on the curation action. The method may include displaying an entity page including at least a portion of the attributes of the entity record to a second user based on permissions of the second user to view the ones of the set of enterprise source documents associated with the mined entity name.

The disclosure also provides a non-transitory computer-readable medium storing computer-executable instructions that when executed by a computer processor cause the computer processor to generate an enterprise knowledge graph. The non-transitory computer-readable medium may include instructions to perform a mining of a set of enterprise source documents within an enterprise intranet to determine a plurality of entity names. The non-transitory computer-readable medium may include instructions to generate an entity record within a knowledge graph for a mined entity name from the plurality of entity names based on an entity schema and ones of the set of enterprise source documents associated with the mined entity name, the entity record including attributes aggregated from the ones of the set of enterprise source documents associated with the mined entity name. The non-transitory computer-readable medium may include instructions to receive a curation action on the entity record from a first user associated with the entity record via the mining. The non-transitory computer-readable medium may include instructions to update the entity record based on the curation action. The non-transitory computer-readable medium may include instructions to display an entity page including at least a portion of the attributes of the entity record to a second user based on permissions of the second user to view the ones of the set of enterprise source documents associated with the mined entity name.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

The present disclosure provides systems and methods for generating, maintaining, and using a knowledge graph for an enterprise. A computer system, e.g., a local or remote server, generates an enterprise knowledge graph based on enterprise source documents accessible via an intranet. The computer system performs a mining of the enterprise source documents for entity names such as project names, organization names, product names, etc. The mining may include comparing enterprise source documents within an enterprise intranet to a plurality of templates defining potential entity attributes to identify extracts of the enterprise source documents matching at least one of the plurality of templates. The computer system parses the extracts according to respective templates of the plurality of templates that match the extracts to determine instances. The computer system performs clustering on a number of the instances to determine potential entity names. The names may be unique to the enterprise such that external sources of the entity names are not available. Accordingly, when a computer system observes multiple instances of a name being used in documents, there may be a level of uncertainty as to whether the name is the correct name for an entity, or whether the name refers to different entities. In various implementations, the present disclosure uses a clustering process to evaluate the uncertainty associated with instances and determine a most likely name, which is referred to as a mined entity name.

The computer system generates an entity record for at least one of the mined entity names based on a schema for the entity. The entity record includes attributes aggregated from the enterprise source documents associated with the mined entity name. The entity record is stored in the knowledge graph. A user within the enterprise that is associated with the entity record and has permissions to edit the entity can perform a curation action on the entity record, and the computer system can update the entity record based on the curation action. Accordingly, as the knowledge graph is accessed and curated by users, the knowledge graph develops into a combination of machine-learned knowledge and user curated knowledge. The computer system may display an entity page including at least a portion of the attributes of the entity record to other users based on permissions of each user to view the enterprise source documents. Accordingly, users within the enterprise may easily access information about the enterprise according to permissions of the underlying source documents.

Figure 1:
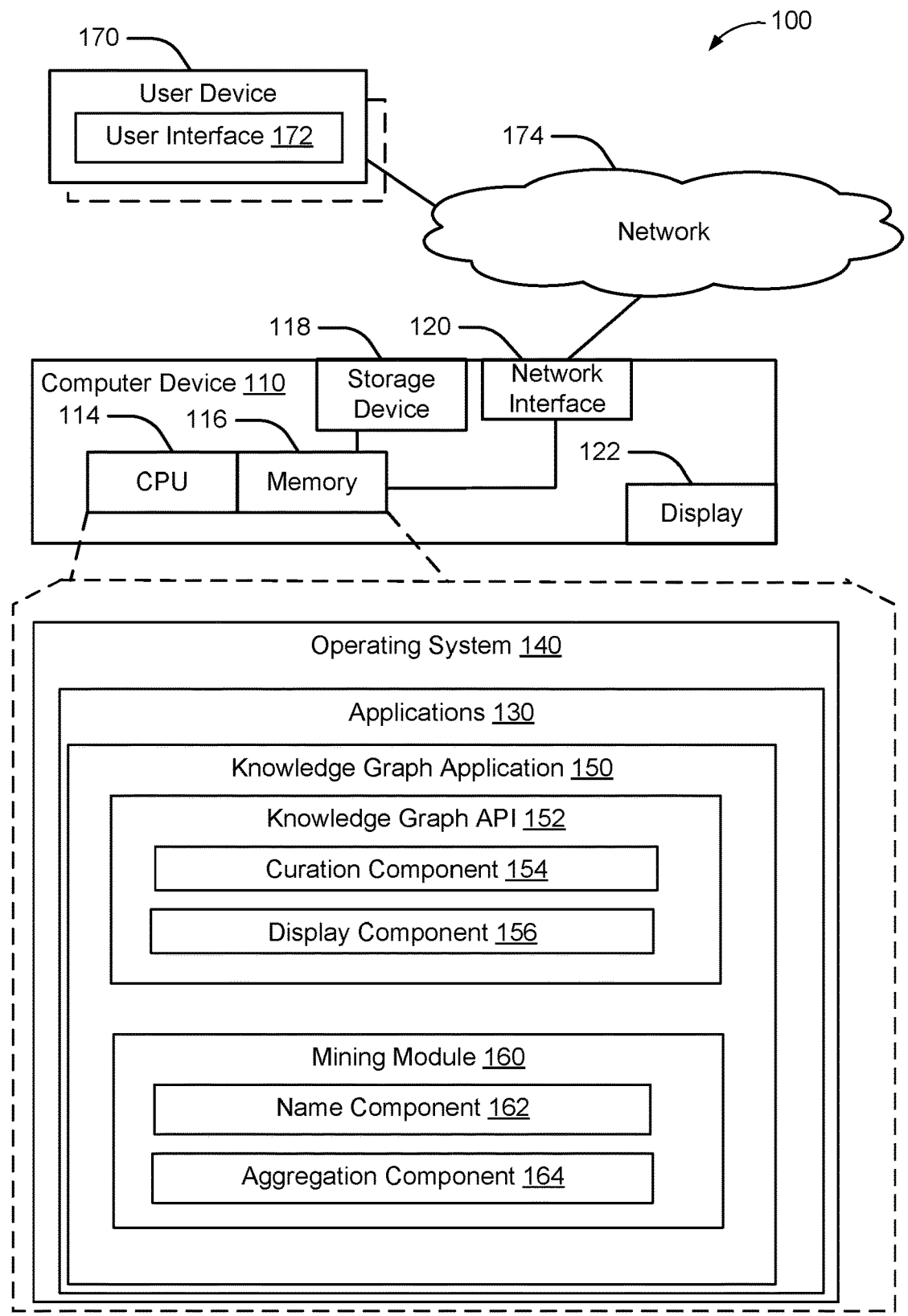
FIG. 1 is a schematic block diagram of an example system for generating, updating, and accessing a knowledge graph, in accordance with an implementation of the present disclosure.

Referring now to FIG. 1, an example knowledge graph system 100 includes a central computer device 110 and a plurality of user devices 170. The central computer device 110 may be, for example, a mobile or fixed computer device including but not limited to a computer server, desktop or laptop or tablet computer, a cellular telephone, a personal digital assistant (PDA), a handheld device, any other computer device having wired and/or wireless connection capability with one or more other devices, or any other type of computerized device capable of processing user interface data.

The computer device 110 may include a central processing unit (CPU) 114 that executes instructions stored in memory 116. For example, the CPU 114 may execute an operating system 140 and one or more applications 130, which may include a knowledge graph application 150. The computer device 110 may also include a network interface 120 for communication with external devices via a network 174, which may be an enterprise intranet. For example, the computer device 110 may communicate with a plurality of user devices 170.

The computer device 110 may include a display 122. The display 122 may be, for example, a computer monitor or a touch-screen. The display 122 may provide information to an operator and allow the operator to configure the computer device 110.

Memory 116 may be configured for storing data and/or computer-executable instructions defining and/or associated with an operating system 140 and/or applications 130, and CPU 114 may execute operating system 140 and/or applications 130. Memory 116 may represent one or more hardware memory devices accessible to computer device 110. An example of memory 116 can include, but is not limited to, a type of memory usable by a computer, such as random access memory (RAM), read only memory (ROM), tapes, magnetic discs, optical discs, volatile memory, non-volatile memory, and any combination thereof. Memory 116 may store local versions of applications being executed by CPU 114. In an implementation, the computer device 110 may include a storage device 118, which may be a non-volatile memory.

The CPU 114 may include one or more processors for executing instructions. An example of CPU 114 can include, but is not limited to, any processor specially programmed as described herein, including a controller, microcontroller, application specific integrated circuit (ASIC), field programmable gate array (FPGA), system on chip (SoC), or other programmable logic or state machine. The CPU 114 may include other processing components such as an arithmetic logic unit (ALU), registers, and a control unit. The CPU 114 may include multiple cores and may be able to process different sets of instructions and/or data concurrently using the multiple cores to execute multiple threads.

The operating system 140 may include instructions (such as applications 130) stored in memory 116 and executable by the CPU 114. The applications 130 may include knowledge graph application 150 configured to generate, manage, and display a knowledge graph storing information regarding an enterprise. The knowledge graph application 150 includes a knowledge graph API 152 that allows a user device 170 or an application executing on a user device 170 to access specific functions of the knowledge graph application 150. For example, the knowledge graph API 152 includes a curation component 154 that receives curation actions from a user. As another example, the knowledge graph API 152 includes a display component 156 that displays at least a portion of an entity page stored in the knowledge graph to a user.

The knowledge graph application 150 includes a mining module 160 that generates and updates entity records to be stored in the knowledge graph. The mining module 160 includes a name component 162 that mines enterprise source documents for entity names. The mining module 160 includes an aggregation component 164 that aggregates information from the enterprise source documents to generate entity records for entity names and other entity metadata mined from the enterprise source documents. The other entity metadata may include people relations, document relations, and dates.

Figure 2:
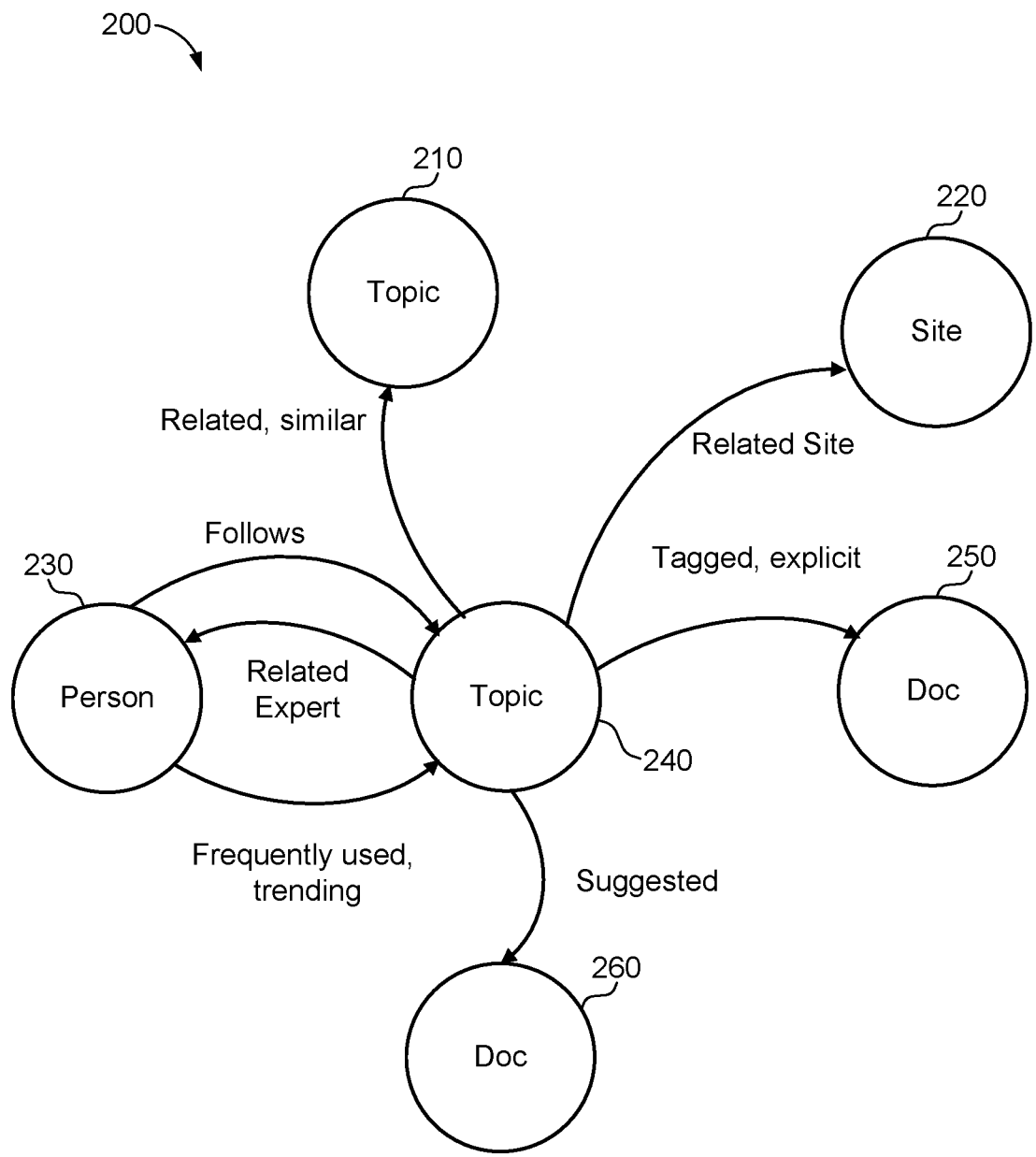
FIG. 2 is a schematic diagram of an example knowledge graph.

Referring now to FIG. 2, an example knowledge graph 200 includes entities 210, 220, 230, 240, 250, 260 and relationships between the entities. In an implementation, each entity is represented by an entity record, which includes attributes that describe the entity. For example, an attribute can store an attribute value or a link to another entity that is related to the entity. A schema for an entity type defines the attributes of the entity.

As illustrated, the example knowledge graph 200 is a partial knowledge graph including entities related to a topic entity 240. For example, another topic entity 210 is related to the topic entity 240 as a related, similar topic. As another example, a site entity 220 is related to the topic entity 240 as a related site. The site entity 220 may be, for example, a website. As another example, the document entity 250 is related to the topic entity 240 as a tagged, explicit document. For example, the document entity 250 can be tagged by a user curating a topic page for the topic entity 240. As a final example, the document entity 260 is related to the topic entity 240 as a suggested document.

Figure 3:
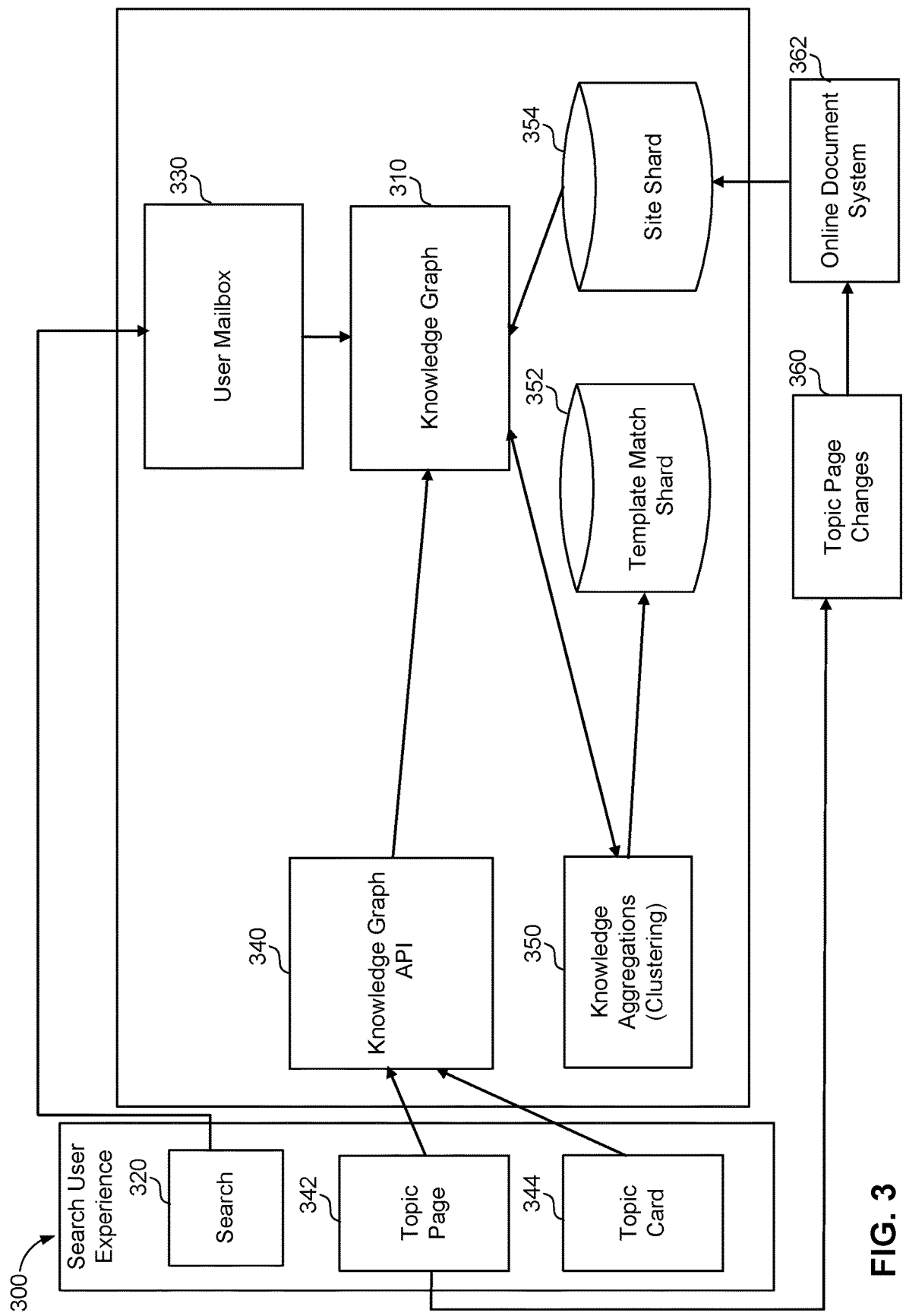
FIG. 3 is a schematic diagram of an example system architecture providing a search user experience for accessing a knowledge graph, in accordance with an implementation of the present disclosure.

FIG. 3 illustrates an example implementation of a system architecture for providing a search user experience utilizing a knowledge graph 310. The knowledge graph 310 is a knowledge graph including entities and relationships as discussed above regarding the example knowledge graph 200. The search user experience can be implemented using private cloud services, enterprise servers, on-premises equipment, or a combination thereof.

A user interface (e.g., user interface 172) includes a search tool 320 that allows searching of the knowledge graph 310. The architecture 300 may be implemented using an enterprise mail system with mailboxes corresponding to particular tasks and particular documents. For instance, a user mailbox 330 receives search requests for the knowledge graph 310.

In an implementation, the knowledge graph 310 may be generated based on mailboxes, but may use another system (e.g., a file management system) to process individual documents. A knowledge aggregations process 350, which is also be referred to herein as clustering, is a batch process responsible for getting enterprise source documents for mining and performing a mining process. The knowledge aggregations process 350 generates or updates the knowledge graph 310 based on the enterprise source documents. For instance, the knowledge aggregations process 350 performs a clustering process on template matches or instances, which are potential entity names extracted from the enterprise source documents and stored in the template match shard 352. The knowledge aggregations process 350 generates new entity records to store in the knowledge graph 310 based on the potential entity names.

The user interface retrieves information from the knowledge graph 310 in the form of a topic page 342 or a topic card 344 via a knowledge graph API 340, which corresponds to the knowledge graph API 152. A topic page 342 is a document for a user including information from the knowledge graph 310 that the user is permitted to view. The permissions to view information from the knowledge graph 310 are based on permissions to view the enterprise source documents that support the entity record in the knowledge graph 310. Accordingly, users cannot use the knowledge graph 310 to gain access to information in source documents to which they do not already have access. A topic card 344 is a display of a subset of information in a topic page 342. A topic card 344 may be integrated into an application for viewing an enterprise source document. For example, an email reader application may highlight or link words in an email to entities in the knowledge graph 310. A user can access the topic card 344 for an entity within the application, for example, by selecting the highlighted or linked word.

A user can curate a topic page 342 by performing a curation action. Curation actions include adding or removing attributes of an entity record including relationships to other entity records. As explained in further detail below, permission to curate a topic page 342 depends on the permissions of the user with respect to the topic page 342. In some cases, multiple topic pages for the same topic are created to show different information to different users. When the user performs a curation action, the topic page changes 360 are provided to an online document system 362 that stores the changes in a site shard 354. The knowledge aggregations process 350 updates the knowledge graph 310 based on the site shard 354 bypassing the clustering process. That is, the curation action provides a feedback to the clustering process because the curation actions populate explicit entities and relationships in the knowledge graph. These explicit entities provide positive labels for inference. Topic pages and relationships serve as authoritative data to seed the set of topics for clustering, which may allow the machine learning process (i.e., clustering) to link more data (e.g., people, files, sites) to the entity than only a mined entity name. Similarly, negative curation actions (e.g., deleting a related entity) may be used to infer a reliability of a template that generated the deleted relationship.

Figure 4:
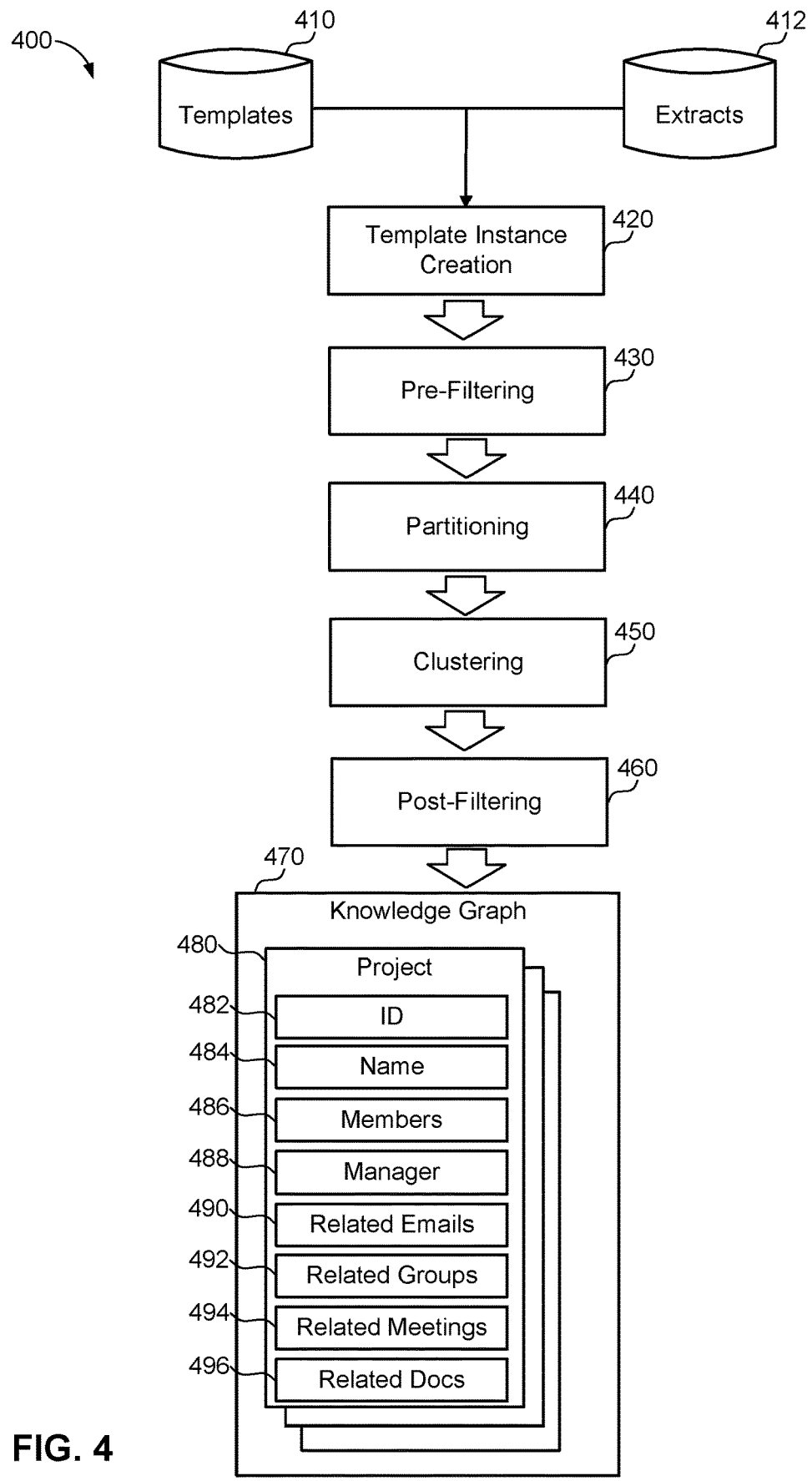
FIG. 4 is a conceptual diagram of an example mining process, in accordance with an implementation of the present disclosure.

Turning to FIG. 4, an example mining process 400 analyzes templates 410 and extracts 412 to generate entities to add to knowledge graph 470. The mining process 400 may be performed for a particular entity type such as a project, which may be defined by a schema. A project is an example of a topic that may be included in the knowledge graph 470. More generally, the mining process 400 identifies potential topic names within the templates 410 and extracts 412. Templates 410 are text or other formatted data with placeholders to insert formatted values of properties of an entity. An entity is an instance of an entity type, and is also referred to herein as an entity record. There are typically many templates per entity type, and these may be represented as a probability distribution over string values, or may be enumerated into a list. Templates combine the formatted property value into text or other formatted data. In an enterprise context, source documents are associated with metadata such as people (e.g., authors, recipients, owners), dates, and changes, which can be used to evaluate uncertainty regarding entity names and to identify relationships between entities.

An extract 412 is a portion of a source document that at least partially matches a template. Templates 410 are used to generate extracts 412 using queries. For example, a query for the template on a set of enterprise source documents compares the template 410 to each of the source documents to identify extracts 412 within the set of enterprise source documents. The extracts 412 at least partially match the template 410. An example extract 412 is a string including the formatted data of the template 410 and additional data, which corresponds to the placeholders in the template 410.

Another example of an extract 412 is a subject line of an email having metadata that matches a template defining metadata (e.g., having a sender email address of a person who approves new projects).

The mining process 400 includes template instance creation process 420 in which extracts 412 are evaluated to determine an uncertainty regarding an entity name (e.g., a project name) associated with each extract 412. The template instance creation process 420 captures the uncertainty around the template match as a string distribution (e.g., alternative strings each associated with a probability).

The mining process 400 optionally includes pre-filtering process 430 in which the system automatically identifies common words that appear in more than a threshold percentage of the instances. Common words associated with a project name include "The," "Project," "Leads" or "Leader." Accordingly, pre-filtering process 430 can be used to improve uncertainty surrounding names by removing common or optional words, which may not occur in every instance of the name.

The mining process 400 includes partitioning process 440 in which the instances are partitioned by all possible entity names. As noted above, the template instance may be represented by a string distribution. In partitioning process 440, instances having overlapping strings may form a single partition. For example, partitioning 340 would group instances having the terms "Project Valkyrie," "Valkyrie" and "Valkyrie Leader" into a single partition, whereas an instance with the term "Sunlamp group" would be in a separate partition.

The mining process 400 includes clustering process 450 in which instances within a partition are clustered to identify project names. The clustering process 450 is performed for each partition either sequentially or in parallel utilizing multiple processors. Clustering process 450 is an unsupervised machine learning process in which the instances are loaded into memory and clustering metadata defining probability distributions between instances are calculated until a stable probability distribution is reached. For example, in an implementation the clustering process 450 may perform Bayesian inference of the probability distribution for each entity. Those entity names with a probability higher than a threshold may be considered established entities, whereas entity names with a probability less than the threshold may be considered formative entities.

The mining process 400 optionally includes post-filtering process 460 in which identified entity names that do not correspond to a target entity type are removed. For example, enterprise documents can include a large number of extracts that refer to a common topic such as a holiday and have similar attributes as a project (e.g., a date, events, people) that are peripheral to the concept of a project. Accordingly, the clustering process 450 would identify those extracts as being related and identify a potential entity name (e.g., the holiday name). The post-filtering process 460 determines that the potential entity name does not correspond to the target entity when none of the clustered instances for the potential entity name match a key template for the entity. For example, a key template for a project entity type includes the word "Project."

The mining process 400 generates entity records such as the project entity record 480 within the knowledge graph 470 based on the mined entity names, associated attributes, and schemas for the entity type. The schema defines attributes within an entity record for an entity type. For example, a project schema defines a project entity record 480 for a project entity type. For instance, the schema for a project entity includes an ID attribute 482, name attribute 484, members attribute 486, manager attribute 488, related emails attribute 490, related groups attribute 492, related meetings attribute 494, and related documents attribute 496. The project entity record 480 includes zero or more attribute values for each attribute. A mandatory attribute may have at least one attribute value. For example, the ID attribute 492, name attribute 484, and members attribute 486 may be mandatory attributes. The mining process 400 populates the attribute values in the project entity record 480 based on the set of enterprise source documents associated with the mined entity name. Accordingly, the project entity record 480 includes attributes aggregated from the set of enterprise source documents associated with the mined entity name.

Figure 5:
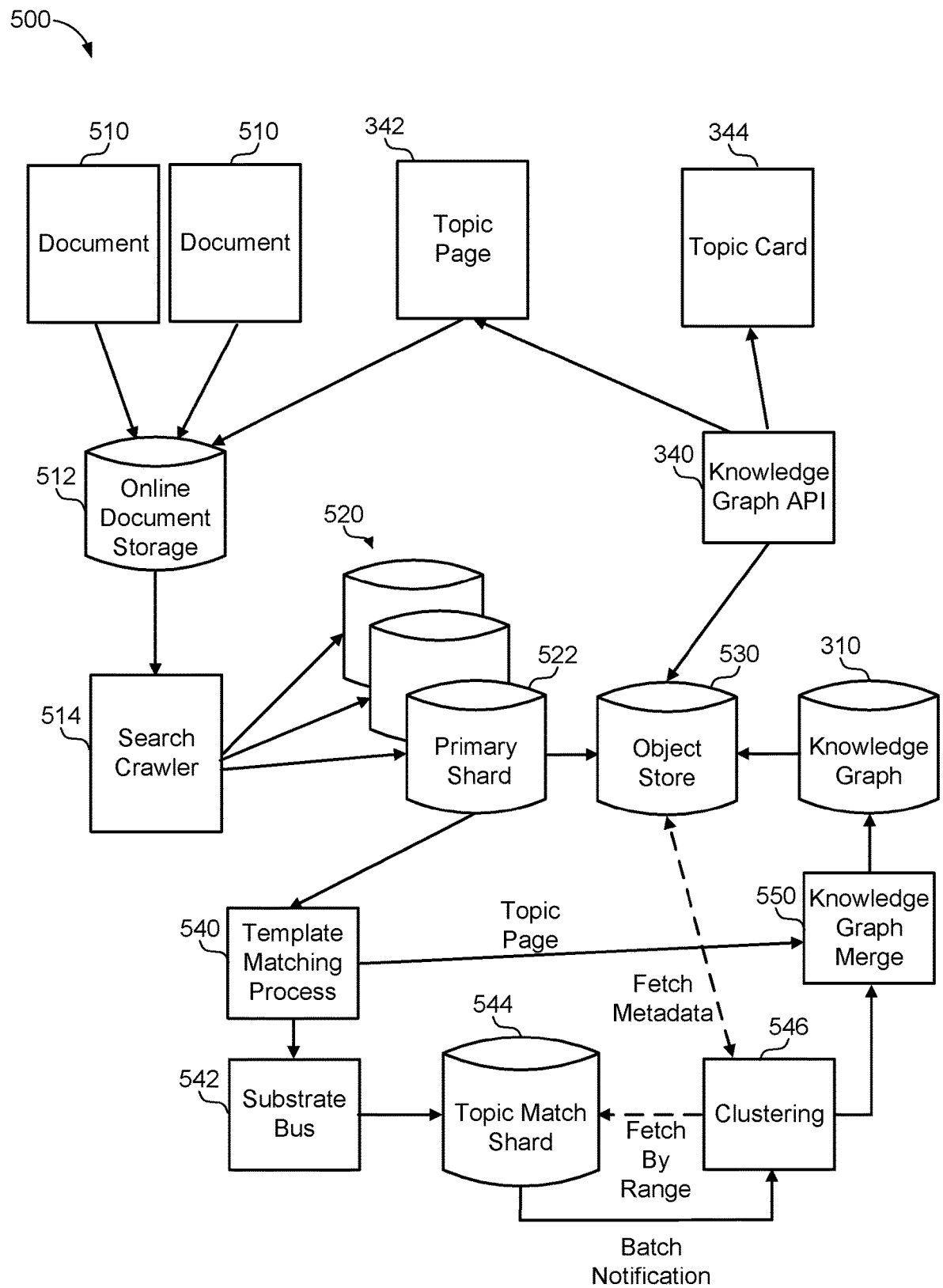
FIG. 5 is a schematic diagram of an example system architecture for managing a knowledge graph, in accordance with an implementation of the present disclosure.

Turning to FIG. 5, an example architecture 500 for generating, managing, and accessing a knowledge graph performs a mining of documents 510 to generate the knowledge graph 310, which is stored in an object store 530. A user can access the knowledge graph 310 via the knowledge graph API 340, which displays a topic page 342 and/or a topic card 344.

The documents 510 are user documents saved to an online document storage 512 within the enterprise intranet. For example, user documents include word processing documents, intranet sites, emails, calendar items, group conversations, group meetings, and other documents generated by the enterprise and stored in the online document storage 512. A search crawler 514 picks up the new document or updated document and pushes the document to a mailbox 520. Mailboxes 520 are grouped into shards 522 including a primary shard. The mailboxes 520 or shards 522 perform analytics to determine metrics for documents such as most popular documents. In an implementation with a distributed architecture, the shards may be associated with geographic regions and there may be at least one shard per region of the enterprise. Data mined or extracted from a document may be stored within a local geographic shard. Region specific policies for data collection, storage, retention, and protection may be implemented on the shard. The clustering process 546, described in further detail below, can access each of the geographic shards from a central location, but does not store user data.

The documents 510 are ingested from the mailboxes into an object store 530. The object store 530 is a platform that provides key value storage, which allows quick data access based on values while enforcing access permission policies. Inside the object store 530, there is a representation of every file inside the enterprise. The representation includes the metadata for the file. The object store 530 implements access permissions to the file. The object store 530 allows retrieval of metadata for the files.

The shards 522 detect events when a new document is added or changed and calls the template matching process 540. The template matching process 540 opens each source enterprise document and compares the new document or modified parts thereof to templates 410. The template matching process 540 creates the extracts 412. The template matching process 540 sends the extracts 412 and a document ID of the corresponding source enterprise document 510 to a topic match shard 544 via a substrate bus 542. The topic match shard 544 is a specialized mailbox that stores extracts from different documents.

A clustering process 546 is performed either periodically as a time based process or incrementally as an event based process. For example, the clustering process 546 receives a batch notification from the topic match shard 544 indicating that either a new clustering should be performed or that a number of matching extracts (e.g., a batch) is ready for incremental clustering. The clustering process 546 is an unsupervised machine learning process that finds groupings or clusters within the extracts. The clustering process 546 performs multiple iterations on the extracts until a stable probability distribution is reached. The clustering process 546 collapses the multiple extracts into a single entity name. The clustering process 546 outputs the entity names and attributes associated with the entity names. The clustering process 546 can fetch metadata from object store 530 for use in the clustering and/or in creating entity records based on entity names. For example, the clustering process 546 generates entity records based on the entity names and populates the entity records using metadata associated with the enterprise source documents supporting the entity names.

A knowledge graph merge process 550 updates the knowledge graph 310 based on the output of the clustering process 546. For example, in an implementation, the knowledge graph merge process 550 simply replaces the existing knowledge graph 310 with a new knowledge graph based on the output of the clustering process 546. Since the source documents include topic pages for previously mined entities, the new knowledge graph may also include the topic pages, which may be supplemented with additional mined related people, documents, etc.

The object store 530 may control access to entity records in the knowledge graph 310 based on permissions of each user to view the set of enterprise source documents associated with the entity record. A topic page 342 is created from an entity record and is owned by a user that creates the topic page 342. Creating the topic page explicitly links the mined entity record to the topic page. A user can also create a topic page that will be added to the knowledge graph 310 as a new entity record based on the content supplied by the user. The topic page owner controls what is displayed on the topic page 342. The knowledge graph 310 provides suggestions for the topic page 342 based on the attributes of the entity record and linked entities.

In an implementation, multiple topic pages on the same topic may be created. For example, the clustering process 546 mines a project entity name for a confidential project based on source documents for the project. An expert associated with the project can create a first topic page that includes data from the source documents that are available to other experts associated with the project. Another user (e.g., an accountant) may have limited access to information about the project (e.g., an invoice with the project name). The accountant may create a second topic page and add information related to the project finances, which becomes available to other users with access to the invoice. Both topic pages are linked to the same project entity record in the knowledge graph 310. A search for the project returns one or both of the topic pages based on the permissions of the user performing the search. An administrator can be provided with a notification of creation of multiple topic pages for the same topic and the administrator determines whether to combine the topic pages or delete one of the topic pages.

Figure 6:
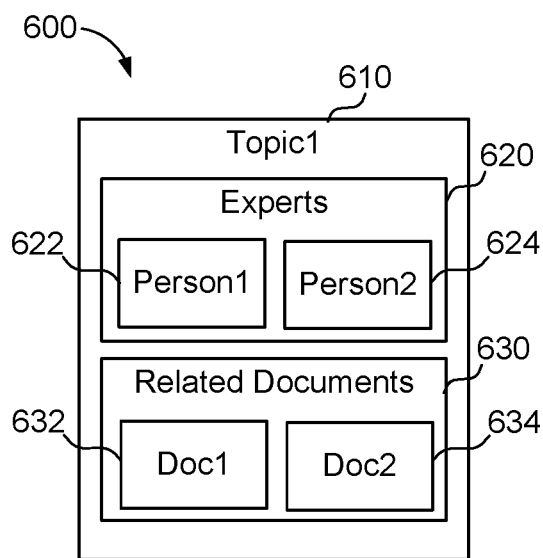
FIG. 6 is a diagram of an example topic entity record, in accordance with an implementation of the present disclosure.

Turning to FIG. 6, an example entity record 600 includes a topic name 610, an experts attribute 620 and a related documents attribute 630. The entity record 600 is a mined entity based on the topic name 610. The experts attribute 620 includes a first person 622 and a second person 624 that are associated with the topic name 610 based on the source documents. The related documents attribute 630 includes a first document 632 and a second document 634, which are the source documents associated with the mined topic name 610.

Figure 7:
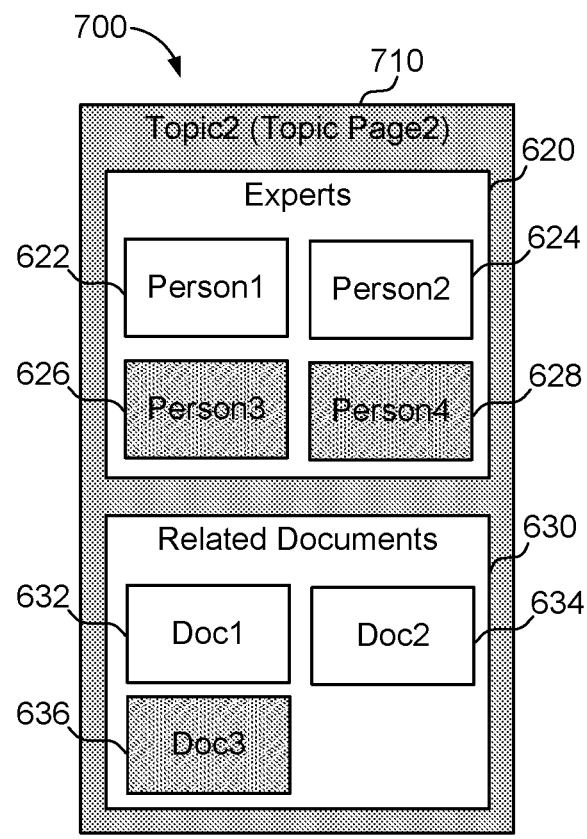
FIG. 7 is a diagram of an example topic entity record including a topic page, in accordance with an implementation of the present disclosure.

Turning to FIG. 7, another example entity record 700 includes a topic page 710. The topic page 710 shares the entity name with the entity record 700. The topic page 710 is created by a user based on the entity record 600. For example, the user has added a third person 626 and a fourth person 628 to the experts attribute 620 and added a third document 636 to the related documents attribute 630.

In an implementation, when a user views a topic page 342 or a topic card 344, content of the topic page 342 or a topic card 344 is trimmed based on permissions of the accessing user. For example, referring to the example entity record 700, the user does not have access to document 632, which was mined, but does have access to document 634 and document 636. In this case, only documents 634 and 636 will appear in the topic page 342 or topic card 344. Since the user has access to documents 634 and 636, the topic page 710 can be displayed and the references to the experts attribute 620 included. If document 632 is the only source for one of the experts (e.g., person 622), then person 622 will not be displayed in the topic page 710.

Referring again to FIG. 5, the knowledge graph API 340 receives requests from a user or an application of the user (e.g., a document viewer application) to view a topic page 342 or topic card 344, which is a subset of a topic page. The knowledge graph API 340 determines a topic key for the request, and submits the request to the object store 530, If the topic key corresponds to a topic page, the object store 530 retrieves the entity record for the topic and determines the sources for the topic page. Otherwise, the objet store returns an indication that there is no corresponding topic. The object store 530 determines the permissions to view each attribute of the topic page as discussed above and returns the source documents to which the user has access. If the user does not have access to any of the sources, the object store 530 returns the indication that there is not corresponding topic. Otherwise, the knowledge graph API 340 constructs the topic page 342 or topic card 344 for viewing based on the entity record and source documents.

In another implementation, access control list (ACL) aggregation is used to control access to topic pages. When a new document is added to a topic, the object store can retrieve the ACL for the document. If the ACL is simple, meaning the ACL does not deny any enterprise users, the ACL can be aggregated into a topic ACL. Otherwise, the ACL can be added to a complex ACL list.

When a document is changed or deleted, the object store 530 can retrieve the original ACL for the document. If there is a change from the original ACL, the object store 530 can get topics related to the document. If the ACL has changed from a complex ACL to a simple ACL or has been deleted, the ACL can be removed from the complex ACL list. If the ACL has changed from a simple ACL to a complex ACL, the ACL can be added to the complex ACL list. The object store 530 can track a access control element (ACE) count for each topic. The topic ACL can be used when the ACE count is above a threshold, and individual ACLs for each document can be used when the ACE count is below the threshold.

Figure 8:
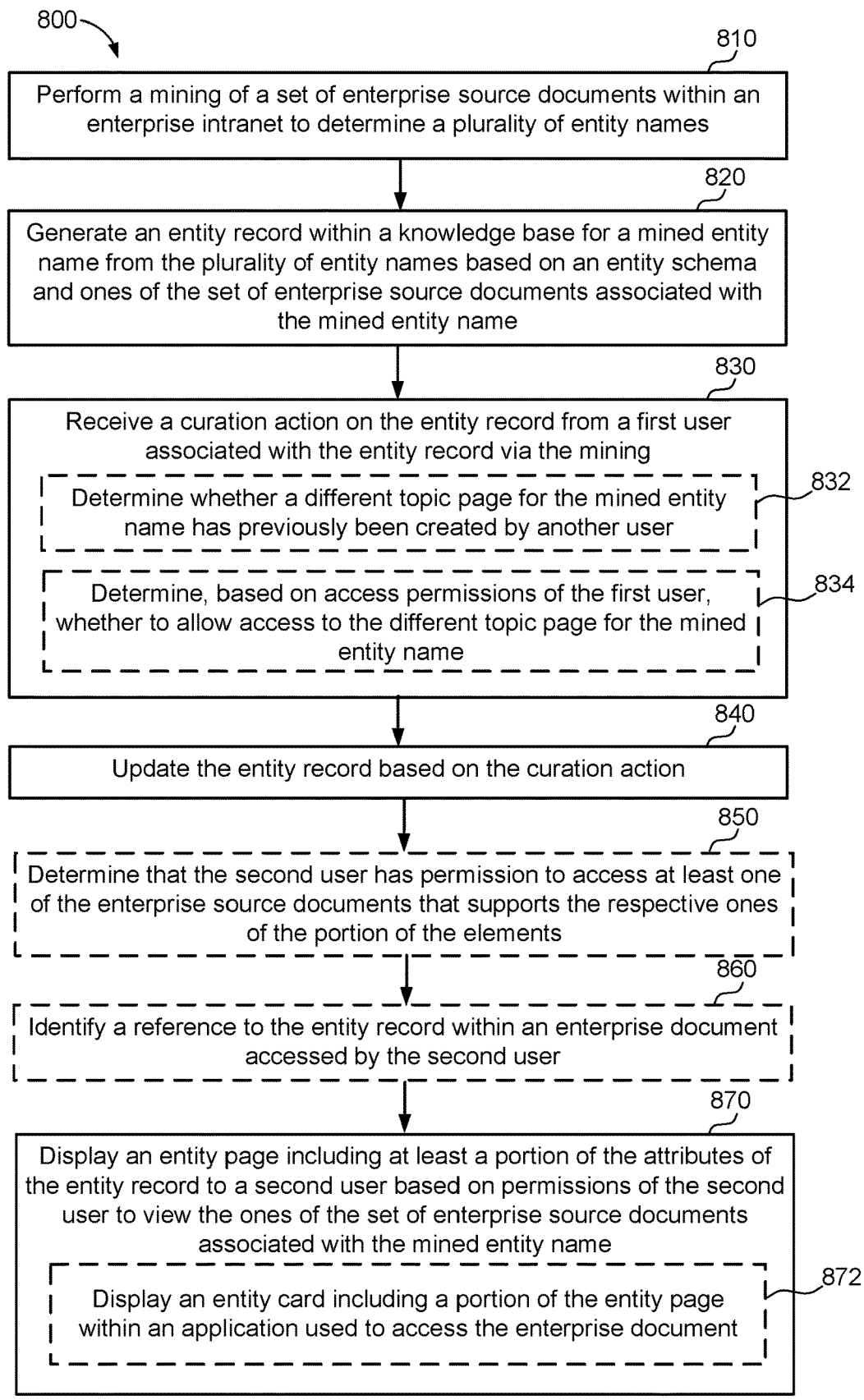
FIG. 8 is a flowchart of an example method of displaying an entity page based on an automatically generated knowledge graph, in accordance with an implementation of the present disclosure.

Turning to FIG. 8, an example method 800 displays an entity page based on an entity record within an automatically generated knowledge graph. For example, method 800 can be performed by the computer device 110, the architecture 300, or the architecture 500. Optional blocks are illustrated with dashed lines.

At block 810, the method 800 includes performing a mining of a set of enterprise source documents within an enterprise intranet to determine a plurality of entity names. In an implementation, the mining module 160 executes the name component 162 to perform the mining of the set of enterprise source documents 510 to determine the plurality of entity names. As discussed above, the mining module 160 and/or the name component 162 can execute the mining process 400 to perform the mining. Further details of block 810 are discussed below with respect to FIG. 9.

At block 820, the method 800 includes generating an entity record within a knowledge graph for a mined entity name from the plurality of entity names based on an entity schema and ones of the set of enterprise source documents associated with the mined entity name. The entity record includes attributes aggregated from the ones of the set of enterprise source documents associated with the mined entity name. In an implementation, the mining module 160 executes the aggregation component 164 to generate the entity record (e.g., project entity record 480) within the knowledge graph 310 for the mined entity name from the plurality of entity names based on the entity schema and ones of the set of enterprise source documents associated with the mined entity name.

At block 830, the method 800 includes receiving a curation action on the entity record from a first user associated with the entity record via the mining. In an implementation, the knowledge graph API 152 executes the curation component 154 to receive the curation action on the entity record from the first user associated with the entity record via the mining. For example, the first user can be the person 622 that is identified as an expert by the experts attribute 620.

For example, in some cases, the curation action is creation of a topic page 342 (e.g., the topic page 710) for the mined entity name. In sub-block 832, the block 830 optionally includes determining whether a different topic page for the mined entity name has previously been created by another user. For instance, the curation component 154 determines whether a different topic page for the mined entity name has previously been created by another user. If a different topic page for the mined entity name has previously been created by another user, in sub-block 834, the block 830 optionally includes determining, based on access permissions of the first user, whether to allow access to the different topic page for the mined entity name. For instance, the curation component 154 determines based on access permissions of the first user, whether to allow access to the different topic page for the mined entity name. For example, the permissions determine whether to first user is allowed to curate the different topic page for the mined entity name.

At block 840, the method 800 includes updating the entity record based on the curation action. In an implementation, the knowledge graph API 152 executes the curation component 154 to update the entity record based on the curation action. For example, the knowledge graph API sends the topic page changes 360 to the online document system 362, and the knowledge aggregations process 350 and/or knowledge graph merge process 550 updates the knowledge graph based on the topic page changes.

At block 850, the method 800 optionally includes determining that the second user has permission to access at least one of the enterprise source documents that support the respective ones of the portion of the attributes. In an implementation, the knowledge graph API 152 executes the display component 156 to determine that the second user has permission to access at least one of the enterprise source documents 510 that supports the respective ones of the portion of the attributes.

At block 860, the method 800 optionally includes identifying a reference to the entity record within an enterprise document accessed by the second user. In an implementation, the knowledge graph API 152 executes the display component 156 to identify the reference to the entity record within an enterprise document accessed by the second user.

At block 870, the method 800 optionally includes displaying an entity page including at least a portion of the attributes of the entity record to a second user based on permissions of the second user to view the ones of the set of enterprise source documents associated with the mined entity name. In an implementation, the knowledge graph API 152 executes the display component 156 to display an entity page including at least a portion of the attributes of the entity record to a second user based on permissions of the second user to view the ones of the set of enterprise source documents associated with the mined entity name. Displaying the entity page may be in response to block 850. In sub-block 872, the block 870 optionally includes displaying an entity card including a portion of the entity page within an application used to access the enterprise document. For instance, the sub-block 872 is optionally performed in response to the block 860. Accordingly, the entity card is displayed to the second user in association with the reference to the entity record.

Figure 9:
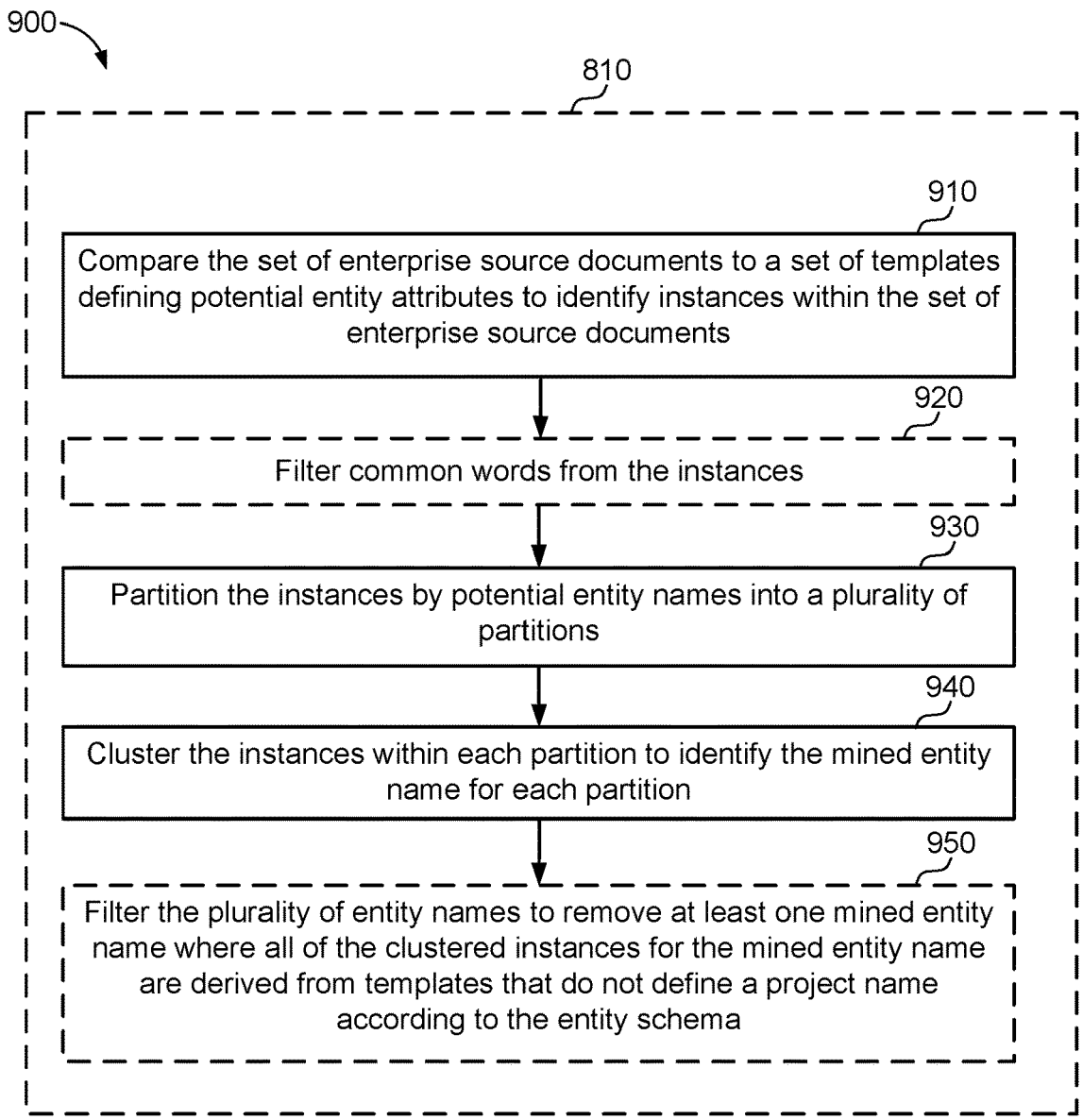
FIG. 9 is a flowchart of an example method of mining entity names from source documents, in accordance with an implementation of the present disclosure.

Turning to FIG. 9, an example method 900 performs a mining of a set of enterprise source documents within an enterprise intranet to determine a plurality of entity names. The method 900 is an example implementation of block 810 of method 800. For example, method 900 can be performed by the computer device 110, the architecture 300, or the architecture 500. Optional blocks are illustrated with dashed lines.

At block 910, the method 900 includes comparing the set of enterprise source documents to a set of templates defining potential entity attributes to identify instances within the set of enterprise source documents. In an implementation, the name component 162 executes the template instance creation process 420 to compare the set of enterprise source documents 510 to a set of templates 410 defining potential entity attributes to identify instances within the set of enterprise source documents.

At block 920, the method 900 optionally includes filtering common words from the instances. In an implementation, the name component 162 executes the pre-filtering process 430 to filter common words from the instances.

At block 930, the method 900 includes partitioning the instances by potential entity names into a plurality of partitions. In an implementation, the name component 162 executes the partitioning process 440 to partition the instances by potential entity names into a plurality of partitions.

At block 940, the method 900 includes clustering the instances within each partition to identify the mined entity name for each partition. In an implementation, the name component 162 executes the clustering process 450 to cluster the instances within each partition to identify the mined entity name for each partition At block 950, the method 900 optionally includes filtering the plurality of entity names to remove at least one mined entity name where all of the clustered instances for the mined entity name are derived from templates that do not define a project name according to the entity schema. In an implementation the name component 162 executes the post-filtering process 460 to filter the plurality of entity names to remove at least one mined entity name where all of the clustered instances for the mined entity name are derived from templates that do not define a project name according to the entity schema. In another implementation, post-filtering may be used to exclude entities that have high level of duplication, indicated by a high number of disconnected instances. For example, project funding, is a common phrase that occurs frequently on different sites. Post-filtering can catch this by eliminating entities with a degree of duplication higher than some threshold (e.g., 5 or more).

Figure 10:
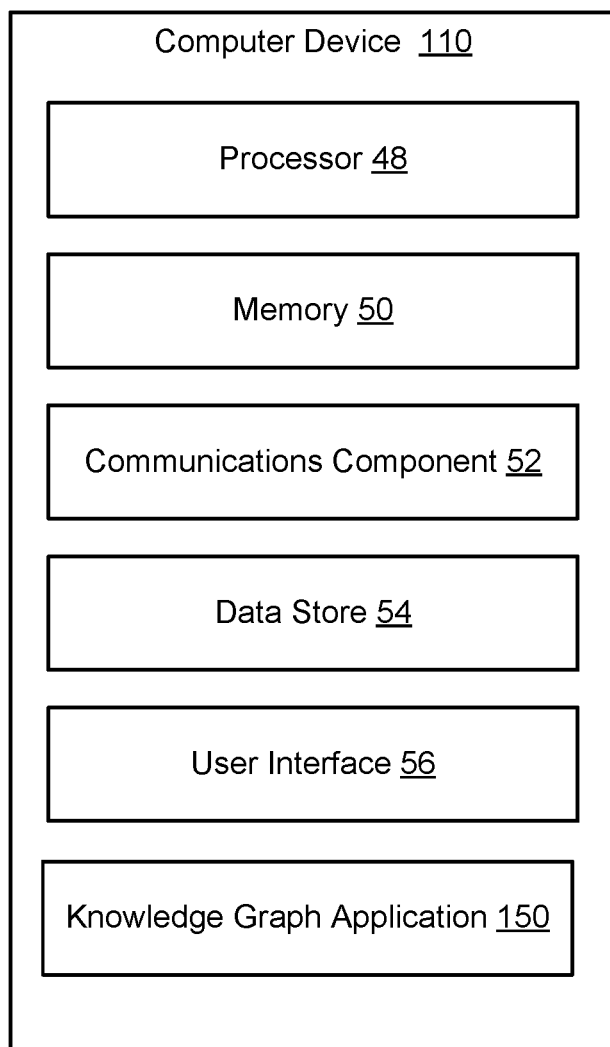
FIG. 10 is a schematic block diagram of an example computer device, in accordance with an implementation of the present disclosure.

Referring now to FIG. 10, illustrated is an example computer device 110 in accordance with an implementation, including additional component details as compared to FIG. 1. In one example, computer device 110 includes processor 48 for carrying out processing functions associated with one or more of components and functions described herein. Processor 48 can include a single or multiple set of processors or multi-core processors. Moreover, processor 48 can be implemented as an integrated processing system and/or a distributed processing system. In an implementation, for example, processor 48 includes the CPU 114.

In an example computer device 110 includes memory 50 for storing instructions executable by the processor 48 for carrying out the functions described herein. In an implementation, for example, memory 50 includes memory 116. The memory 50 includes instructions for executing the knowledge graph application 150.

Further, computer device 110 includes a communications component 52 that provides for establishing and maintaining communications with one or more parties utilizing hardware, software, and services as described herein. Communications component 52 carries communications between components on computer device 110, as well as between computer device 110 and external devices, such as devices located across a communications network and/or devices serially or locally connected to computer device 110. For example, communications component 52 includes one or more buses, and may further include transmit chain components and receive chain components associated with a transmitter and receiver, respectively, operable for interfacing with external devices.

Additionally, computer device 110 includes a data store 54, which can be any suitable combination of hardware and/or software, that provides for mass storage of information, databases, and programs employed in connection with implementations described herein. For example, data store 54 can be a data repository for the knowledge graph application (e.g., for storing the knowledge graph 310). The data store 54 includes memory 116 and/or a storage device 118.

Computer device 110 can also include a user interface component 56 operable to receive inputs from a user of computer device 110 and further operable to generate outputs for presentation to the user. User interface component 56 includes one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, user interface component 56 includes one or more output devices, including but not limited to a display, a speaker, a haptic feedback mechanism, a printer, any other mechanism capable of presenting an output to a user, or any combination thereof.

In an implementation, user interface component 56 transmits and/or receives messages corresponding to the operation of knowledge graph application 150. In addition, processor 48 executes knowledge graph application 150, and memory 50 or data store 54 stores knowledge graph application 150.

As used in this application, the terms "component," "system" and the like are intended to include a computer-related entity, such as but not limited to hardware, firmware, a combination of hardware and software, software, or software in execution. For example, a component includes, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features have been presented in terms of systems that include a number of devices, components, modules, and the like. A person skilled in the art should understand and appreciate that the various systems can include additional devices, components, modules, etc. and/or may not include all of the devices, components, modules etc. discussed in connection with the figures. A combination of these approaches can also be used.

The various illustrative logics, logical blocks, and actions of methods described in connection with the embodiments disclosed herein can be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor includes a microprocessor, but, in the alternative, the processor can be any conventional processor, controller, microcontroller, or state machine. A processor can also be implemented as a combination of computer devices, e.g., a combination of a DSP and a microprocessor, a plurality of microprocessors, one or more microprocessors in conjunction with a DSP core, or any other such configuration. Additionally, at least one processor can comprise one or more components operable to perform one or more of the steps and/or actions described above.

Further, the steps and/or actions of a method or procedure described in connection with the implementations disclosed herein can be embodied directly in hardware, in a software module executed by a processor, or in a combination of the two. A software module resides in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium can be integral to the processor. Further, in some implementations, the processor and the storage medium reside in an ASIC. Additionally, the ASIC can reside in a user terminal. In the alternative, the processor and the storage medium can reside as discrete components in a user terminal. Additionally, in some implementations, the steps and/or actions of a method or procedure may reside as one or any combination or set of codes and/or instructions on a machine readable medium and/or computer readable medium, which can be incorporated into a computer program product.

In one or more implementations, the functions described can be implemented in hardware, software, firmware, or any combination thereof. If implemented in software, the functions are stored or transmitted as one or more instructions or code on a computer-readable medium. Computer-readable media includes both computer storage media and communication media including any medium that facilitates transfer of a computer program from one place to another. A storage medium can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above can be made without departing from the scope hereof. Other implementations will be apparent to those skilled in the art from a consideration of the specification or from a practice in accordance with examples disclosed herein.

SOME FURTHER EXAMPLE IMPLEMENTATIONS

An example computer system comprising: a memory storing computer-executable instructions; a processor configured to execute the instructions to: perform a mining of a set of enterprise source documents within an enterprise intranet to determine a plurality of entity names; generate an entity record within a knowledge graph for a mined entity name from the plurality of entity names based on an entity schema and ones of the set of enterprise source documents associated with the mined entity name, the entity record including attributes aggregated from the ones of the set of enterprise source documents associated with the mined entity name; receive a curation action on the entity record from a first user associated with the entity record via the mining; update the entity record based on the curation action; and display an entity page including at least a portion of the attributes of the entity record to a second user based on permissions of the second user to view the ones of the set of enterprise source documents associated with the mined entity name. Accordingly, the computer system allows construction of enterprise knowledge graphs. That is, the computer system is a tool that would allow creation of an enterprise specific knowledge graph, in order to make enterprise knowledge easily available to employees in queries and other experiences. The computer system combines machine mining with user curation, in order for the initial knowledge graph to be created automatically and machines continue doing the tedious work of aggregating knowledge, while humans would be involved in correcting the inevitable mistakes the machine makes.

The above example computer system, wherein the entity record includes metadata defining supporting enterprise source documents for each of the attributes of the entity record.

Any of the above example computer systems, wherein the processor is configured to display respective ones of the portion of the attributes included in the entity page to the second user in response to determining that the second user has permission to access at least one of the enterprise source documents that supports the respective ones of the portion of the attributes.

Any of the above example computer systems, wherein the processor is configured to perform the mining of the set of enterprise source documents by: comparing the set of enterprise source documents to a set of templates defining potential entity attributes to identify instances within the set of enterprise source documents; partitioning the instances by potential entity names into a plurality of partitions; and clustering the instances within each partition to identify the mined entity name for each partition.

Any of the above example computer systems, wherein the entity record is a project entity record, wherein the processor is configured to: filter common words from the instances; and filter the plurality of entity names to remove at least one mined entity name where all of the clustered instances for the mined entity name are derived from templates that do not define a project name according to the entity schema.

Any of the above example computer systems, wherein the entity record is a project entity record, wherein the process is configured to filter entities that have a number of disconnected instances that exceeds a threshold.

Any of the above example computer systems, wherein the curation action comprises creation of a topic page for the mined entity name, wherein the processor is configured to, in response to receiving the curation action from the first user: determine whether a different topic page for the mined entity name has previously been created by another user; and determine, based on access permissions of the first user, whether to allow access to the different topic page for the mined entity name.

Any of the above example computer systems, wherein the entity record is a project entity record and the entity schema defines an identifier, a name, one or more members, one or more related groups or sites, and one or more related documents.

The above example computer system, wherein the entity schema further defines one or more managers, one or more related emails, or one or more related meetings.

Any of the above example computer systems, wherein the processor is further configured to: identify a reference to the entity record within an enterprise document accessed by the second user; and wherein to display the portion of the entity page further comprises to display an entity card including a portion of the entity page within an application used to access the enterprise document.

An example method comprising: performing a mining of a set of enterprise source documents within an enterprise intranet to determine a plurality of entity names; generating an entity record within a knowledge graph for a mined entity name from the plurality of entity names based on an entity schema and ones of the set of enterprise source documents associated with the mined entity name, the entity record including attributes aggregated from the ones of the set of enterprise source documents associated with the mined entity name; receiving a curation action on the entity record from a first user associated with the entity record via the mining; updating the entity record based on the curation action; and displaying an entity page including at least a portion of the attributes of the entity record to a second user based on permissions of the second user to view the ones of the set of enterprise source documents associated with the mined entity name.

The above example method, wherein the entity record includes metadata defining supporting enterprise source documents for each of the attributes of the entity record, and wherein displaying the entity page comprises displaying respective ones of the portion of the attributes included in the entity page to the second user in response to determining that the second user has permission to access at least one of the supporting enterprise source documents that supports the respective ones of the portion of the attributes.

Any of the above example methods, wherein performing the mining of the set of enterprise source documents comprises: comparing the set of enterprise source documents to a set of templates defining potential entity attributes to identify instances within the set of enterprise source documents; partitioning the instances by potential entity names into a plurality of partitions; and clustering the instances within each partition to identify the mined entity name for each partition.

Any of the above example methods, wherein the entity record is a project entity record, wherein performing the mining comprises: filtering common words from the instances; and filtering the plurality of entity names to remove at least one mined entity name where all of the clustered instances for the mined entity name are derived from templates that do not define a project name according to the entity schema or the mined entity name has a number of disconnected instances that exceeds a threshold.

Any of the above example methods, wherein the curation action comprises creation of a project entity for the mined entity name, further comprising, in response to receiving the curation action from the first user: determining whether a different project entity for the mined entity name has previously been created by another user; and determining, based on access permissions of the first user, whether to allow access to the different project entity for the mined entity name.

Any of the above example methods, further comprising identifying a reference to the entity record within an enterprise document accessed by the second user; and wherein displaying the portion of the entity page comprises displaying an entity card including a portion of the entity page within an application used to access the enterprise document.

An example non-transitory computer-readable medium storing computer executable instructions that when executed by a computer processor cause the computer processor to: perform a mining of a set of enterprise source documents within an enterprise intranet to determine a plurality of entity names; generate an entity record within a knowledge graph for a mined entity name from the plurality of entity names based on an entity schema and ones of the set of enterprise source documents associated with the mined entity name, the entity record including attributes aggregated from the ones of the set of enterprise source documents associated with the mined entity name; receive a curation action on the entity record from a first user associated with the entity record via the mining; update the entity record based on the curation action; and display an entity page including at least a portion of the attributes of the entity record to a second user based on permissions of the second user to view the ones of the set of enterprise source documents associated with the mined entity name.

The above non-transitory computer-readable medium, wherein the entity record includes metadata defining supporting enterprise source documents for each of the attributes of the entity record.

Any of the above non-transitory computer-readable mediums, comprising instructions to display respective ones of the portion of the attributes included in the entity page to the second user in response to determining that the second user has permission to access at least one of the enterprise source documents that supports the respective ones of the portion of the attributes.

Any of the above non-transitory computer-readable mediums, comprising instructions to perform the mining of the set of enterprise source documents by: comparing the set of enterprise source documents to a set of templates defining potential entity attributes to identify instances within the set of enterprise source documents; partitioning the instances by potential entity names into a plurality of partitions; and clustering the instances within each partition to identify the mined entity name for each partition.

What is claimed is:

1. A computer system comprising:
a memory storing computer-executable instructions; and
a processor configured to execute the instructions to:
perform a mining of a set of enterprise source documents within an enterprise intranet to determine a plurality of entity names, wherein the processor is configured to perform the mining of the set of enterprise source documents by:
comparing the set of enterprise source documents to a set of templates defining potential entity attributes to identify instances within the set of enterprise source documents;
partitioning the instances by potential entity names into a plurality of partitions; and
clustering the instances within each partition to identify the mined entity name for each partition using an unsupervised machine learning process that iteratively finds groupings among extracts of the enterprise source documents including the instances until a stable probability distribution is reached;
generate an entity record within a knowledge graph for a mined entity name from the plurality of entity names based on an entity schema and ones of the set of enterprise source documents associated with the mined entity name, the entity record including attributes aggregated from the ones of the set of enterprise source documents associated with the mined entity name;
receive a curation action on the entity record from a first user associated with the entity record via the mining;
update the entity record based on the curation action; and
display an entity page including at least a portion of the attributes of the entity record to a second user based on permissions of the second user to view the ones of the set of enterprise source documents associated with the mined entity name.

2. The computer system of claim 1, wherein the entity record includes metadata defining supporting enterprise source documents for each of the attributes of the entity record.

3. The computer system of claim 2, wherein the processor is configured to display respective ones of the portion of the attributes included in the entity page to the second user in response to determining that the second user has permission to access at least one of the enterprise source documents that supports the respective ones of the portion of the attributes.

4. The computer system of claim 1, wherein the entity record is a project entity record, wherein the processor is configured to:
filter common words from the instances; and
filter the plurality of entity names to remove at least one mined entity name where all of the clustered instances for the mined entity name are derived from templates that do not define a project name according to the entity schema.

5. The computer system of claim 1, wherein the entity record is a project entity record, wherein the processor is configured to filter entities that have a number of disconnected instances that exceeds a threshold.

6. The computer system of claim 1, wherein the curation action comprises creation of a topic page for the mined entity name, wherein the processor is configured to, in response to receiving the curation action from the first user:
determine whether a different topic page for the mined entity name has previously been created by another user; and
determine, based on access permissions of the first user, whether to allow access to the different topic page for the mined entity name.

7. The computer system of claim 1 wherein the entity record is a project entity record and the entity schema defines an identifier, a name, one or more members, one or more related groups or sites, and one or more related documents.

8. The computer system of claim 7, wherein the entity schema further defines one or more managers, one or more related emails, or one or more related meetings.

9. The computer system of claim 1, wherein the processor is further configured to:
identify a reference to the entity record within an enterprise document accessed by the second user;
wherein to display the portion of the entity page further comprises to display an entity card including a portion of the entity page within an application used to access the enterprise document.

10. A method of managing an entity record within a knowledge graph, comprising:
performing a mining of a set of enterprise source documents within an enterprise intranet to determine a plurality of entity names, wherein performing the mining of the set of enterprise source documents comprises:
comparing the set of enterprise source documents to a set of templates defining potential entity attributes to identify instances within the set of enterprise source documents;
partitioning the instances by potential entity names into a plurality of partitions; and
clustering the instances within each partition to identify the mined entity name for each partition, wherein the clustering comprises performing an unsupervised machine learning process that iteratively finds groupings among extracts of the enterprise source documents including the instances until a stable probability distribution is reached;
generating an entity record within a knowledge graph for a mined entity name from the plurality of entity names based on an entity schema and ones of the set of enterprise source documents associated with the mined entity name, the entity record including attributes aggregated from the ones of the set of enterprise source documents associated with the mined entity name;
receiving a curation action on the entity record from a first user associated with the entity record via the mining;
updating the entity record based on the curation action; and
displaying an entity page including at least a portion of the attributes of the entity record to a second user based on permissions of the second user to view the ones of the set of enterprise source documents associated with the mined entity name.

11. The method of claim 10, wherein the entity record includes metadata defining supporting enterprise source documents for each of the attributes of the entity record, and wherein displaying the entity page comprises displaying respective ones of the portion of the attributes included in the entity page to the second user in response to determining that the second user has permission to access at least one of the supporting enterprise source documents that supports the respective ones of the portion of the attributes.

12. The method of claim 10, wherein the entity record is a project entity record, wherein performing the mining comprises:
filtering common words from the instances; and
filtering the plurality of entity names to remove at least one mined entity name where all of the clustered instances for the mined entity name are derived from templates that do not define a project name according to the entity schema or the mined entity name has a number of disconnected instances that exceeds a threshold.

13. The method of claim 10, wherein the curation action comprises creation of a project entity for the mined entity name, further comprising, in response to receiving the curation action from the first user:
determining whether a different project entity for the mined entity name has previously been created by another user; and
determining, based on access permissions of the first user, whether to allow access to the different project entity for the mined entity name.

14. The method of claim 10, further comprising identifying a reference to the entity record within an enterprise document accessed by the second user; and wherein displaying the portion of the entity page comprises displaying an entity card including a portion of the entity page within an application used to access the enterprise document.

15. A non-transitory computer-readable medium storing computer-executable instructions that when executed by a computer processor cause the computer processor to:
perform a mining of a set of enterprise source documents within an enterprise intranet to determine a plurality of entity names, wherein the instructions to perform the mining include instructions to:
compare the set of enterprise source documents to a set of templates defining potential entity attributes to identify instances within the set of enterprise source documents;
partition the instances by potential entity names into a plurality of partitions; and cluster the instances within each partition to identify the mined entity name for each partition, wherein the instructions to cluster comprise instructions to perform an unsupervised machine learning process that iteratively finds groupings among extracts of the enterprise source documents including the instances until a stable probability distribution is reached;

generate an entity record within a knowledge graph for a mined entity name from the plurality of entity names based on an entity schema and ones of the set of enterprise source documents associated with the mined entity name, the entity record including attributes aggregated from the ones of the set of enterprise source documents associated with the mined entity name;

receive a curation action on the entity record from a first user associated with the entity record via the mining;

update the entity record based on the curation action; and display an entity page including at least a portion of the attributes of the entity record to a second user based on permissions of the second user to view the ones of the set of enterprise source documents associated with the mined entity name.

16. The non-transitory computer-readable medium of claim 15, wherein the entity record includes metadata defining supporting enterprise source documents for each of the attributes of the entity record.

17. The non-transitory computer-readable medium of claim 16, comprising instructions to display respective ones of the portion of the attributes included in the entity page to the second user in response to determining that the second user has permission to access at least one of the enterprise source documents that supports the respective ones of the portion of the attributes.

* * * * *